United States Patent

Kalbe et al.

[11] Patent Number: 6,008,276
[45] Date of Patent: Dec. 28, 1999

[54] POLYMER BLENDS CONTAINING STARCH AND POLYURETHANE

[75] Inventors: Jochen Kalbe, Leichlingen; Hanns-Peter Müller, Odenthal; Rainhard Koch, Köln, all of Germany

[73] Assignee: Bayer Aktiengesellschaft, Leverkusen, Germany

[21] Appl. No.: 08/973,038

[22] PCT Filed: May 20, 1996

[86] PCT No.: PCT/EP96/02161

§ 371 Date: Nov. 24, 1997

§ 102(e) Date: Nov. 24, 1997

[87] PCT Pub. No.: WO96/38502

PCT Pub. Date: Dec. 5, 1996

[30] Foreign Application Priority Data

Jun. 1, 1995 [DE] Germany .................. 195 20 093

[51] Int. Cl.[6] .............. C08L 3/02; C08L 75/00; C08K 5/21; C08K 5/053
[52] U.S. Cl. ................. 524/47; 523/128; 524/211; 524/386; 524/591
[58] Field of Search ............. 524/47, 590, 591, 524/211, 386; 523/124, 128

[56] References Cited

U.S. PATENT DOCUMENTS

| | | | |
|---|---|---|---|
| 3,004,934 | 10/1961 | Dosman et al. | 524/47 |
| 3,639,309 | 2/1972 | Starkman | 524/47 |
| 5,095,054 | 3/1992 | Lay et al. | |
| 5,412,005 | 5/1995 | Bastioli et al. | |
| 5,436,078 | 7/1995 | Buhler et al. | 428/474.4 |
| 5,439,953 | 8/1995 | Ritter et al. | 524/47 |
| 5,543,494 | 8/1996 | Perego et al. | |

FOREIGN PATENT DOCUMENTS

| | | |
|---|---|---|
| 0 596 437 B1 | 5/1994 | European Pat. Off. |
| 20 35 732 | 1/1972 | Germany. |
| 34 28 111 | 3/1985 | Germany. |
| 1 336 050 | 11/1973 | United Kingdom. |
| 1 524 821 | 9/1978 | United Kingdom. |
| WO 92 10539 | 2/1972 | WIPO. |

OTHER PUBLICATIONS

Agricultural & Synthetic Polymers, Biodegradability & Utilization, ASC Symposium Series 433, 1990, pp. 3–13, edited by J.S. Glass & G. Swift.

*Primary Examiner*—Peter A. Szekely
*Attorney, Agent, or Firm*—Sprung Kramer Schaefer & Briscoe

[57] ABSTRACT

Thermoplastically moldable, biodegradable, starch-containing polymer blends consisting essentially of A) 100 parts by weight of anhydrous starch,
B) from 0.1 to 70 parts by weight of polyurethane containing urea groups and based on selected starting materials,
C) from 0.5 to 70 parts by weight of a plasticizer component and
D) from 2 to 20 parts by weight of water, a process for producing these blends by mixing the individual components in plastics processing machines and their use for producing moldings, films, fibers, coatings or laminates by thermoplastic processing.

6 Claims, No Drawings

POLYMER BLENDS CONTAINING STARCH AND POLYURETHANE

The invention relates to thermoplastically processable and biodegradable, starch-containing polymer blends, a process for their production and their use for producing mouldings, films, fibres, coatings or laminates by thermoplastic processing.

The property profile of thermoplastically processable starch can be improved and optimized by mixing the starch, e.g. during an extrusion process, with synthetic polymers.

Suitable polymers for this purpose are, in particular, hydrophilic polymers such as polyvinyl alcohol or cellulose ethers (DE 4 237 535) or ionic polysaccharide derivatives or ionic polymers (U.S. Pat. No. 5,095,054). In addition, the patent literature describes a wide variety of blends of starch with organic mixing components, in particular plastics such as polyurethanes, polyamides, polyesteramides, polystyrene, polyacrylonitrile, polyacrylates and the like (cf. for example WO 94/03543, WO 92/19680, DE 4 038 732, and also the European patent applications published under the numbers 536 679, 409 783, 409 788, 409 789, 407 781, 408 501, 408 502, 408 503, 407 350, 404 723, 404 728 or 327 505).

The biodegradability of starch-containing polymer blends requires that all constituents of the blend are biodegradable. However, it is known that the conventional polymers having a continuous C—C linkage are, with the exception of PVA, not biodegradable (cf. for example Agricultural and Synthetic Polymers, Biodegradability and Utilization, ASC Symposium Series 433, 1990, page 6, edited by J. S. Glass and G. Swift). The commercially available polyamides and most of the known polysaccharide derivatives are also not biodegradable.

However, examples of biodegradable blending partners for starch are poly-ε-caprolactone, polyhydroxybutyric acid-valeric acid copolymers or polylactide-glucolide copolymers (DE 4 237 535). These polymers are, however, hydrophobic substances which can be combined with the starch to give the polymer blend only with concomitant use of phase compatibilizers or of further hydrophilic polymers.

It was therefore an object of the invention to provide new, thermoplastically processable and biodegradable, starch-containing polymer blends which can be thermoplastically processed to give end products having good mechanical properties and can be produced by combining the starch with aqueous dispersions of self-emulsifiable plastics.

This object was able to be achieved by means of the polymer blends described in detail below or by means of the process for their production.

The invention provides thermoplastically mouldable, biodegradable, starch-containing polymer blends consisting essentially of A) 100 parts by weight of anhydrous starch,
B) from 0.1 to 70 parts by weight of polyurethane containing urea groups,
C) from 0.5 to 70 parts by weight of a plasticizer component comprising urea and/or at least one polyhydric alcohol of the molecular weight range from 62 to 400 and
D) from 2 to 20 parts by weight of water, characterized in that the component B) comprises polyurethanes containing urea groups which have been prepared by known methods, with the equivalence ratio of isocyanate groups to groups capable of reacting with isocyanate groups being from 1:1 to 2:1, from a) a diisocyanate component comprising
  a1) hexamethylene diisocyanate or
  a2) mixtures of hexamethylene diisocyanate with a total of up to 60% by weight, based on the mixture, of 1-isocyanato-3,3,5-trimethyl-5-isocyanatomethyl-cyclohexane and/or 4,4'-diisocyanatodicyclohexylmethane and/or 1-methyl-2,4 (6)diisocyanatocyclohexane together with
b) a diol component comprising
  b1) at least one polyesterdiol having a molecular weight calculable from the hydroxyl group content of from 500 to 10,000 from (i) adipic acid and/or succinic acid and (ii) at least one alkanediol having from 2 to 6 carbon atoms or
  b2) a mixture of such polyesterdiols containing up to 32% by weight, based on the total weight of the component b), of alkanediols having from 2 to 6 carbon atoms and optionally containing ether groups,
c) a diamine component in an amount of from 2 to 50 equivalent-%, based on the total amount of the groups capable of reacting with isocyanate groups and present in the components b) and c), comprising
  c1) diaminosulphonates of the general formula

or
  c2) mixtures of diaminosulphonates c1) with up to 90% by weight, based on the total weight of the component c), of ethylenediamine, optionally
d) hydrophilic polyether alcohols of the general formula

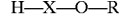

in an amount of up to 10% by weight, based on the total weight of the components b), c) and d), and optionally
e) water which is not included in the calculation of the equivalence ratio of isocyanate groups to groups capable of reacting with isocyanate groups,
where, in the above general formulae,
m and n represent, independently of one another, numbers from 2 to 6,
Me represents potassium or sodium,
R represents a monovalent hydrocarbon radical having from 1 to 12 carbon atoms, and
X is a polyalkylene oxide chain of the molecular weight range from 88 to 4000, whose alkylene oxide units comprise at least 40% of ethylene oxide units and the remainder are propylene oxide units.

The invention also provides a process for producing such polymer blends by mixing the individual components at from 80 to 150° C. in plastics processing machines, where the starch A) is optionally used in the form of water-containing starch and/or the plasticizers C) are optionally used in the form of aqueous solutions, with simultaneous or subsequent removal of the introduced water by evaporation to a residual content of from 2 to 20 parts by weight per 100 parts by weight of anhydrous starch, characterized in that the polyurethanes B) containing urea groups are used in the form of aqueous dispersions which have a strength of from 20 to 50% by weight and which have been prepared by known methods, with the equivalence ratio of isocyanate groups to groups capable of reacting with isocyanate groups being from 1:1 to 2:1, from
a) a diisocyanate component comprising
  a1) hexamethylene diisocyanate or
  a2) mixtures of hexamethylene diisocyanate with a total of up to 60% by weight, based on the mixture, of 1-isocyanato-3,3,5-trimethyl-5-isocyanatomethylcyclohexane and/or 4,4'-diisocyanatodicyclohexylmethane and/or 1-methyl-2,4(6)diisocyanatocyclohexane together with b) a diol component comprising b1) at least one polyesterdiol having a molecular weight calculable from the hydroxyl group content of from 500 to 10,000 from (i) adipic acid and/or succinic acid and (ii) at least one alkanediol having from 2 to 6 carbon atoms or b2) a mixture of such polyesterdiols containing up to 32% by weight, based on the total weight of the component b), of alkanediols having from 2 to 6 carbon atoms and optionally containing ether groups, c) a diamine component in an amount of from 2 to 50 equivalent-%, based on the total amount of the groups capable of reacting with isocyanate groups and present in the components b) and c), comprising c1) diaminosulphonates of the general formula

or c2) mixtures of diaminosulphonates c1) with up to 90% by weight, based on the total weight of the component c), of ethylenediamine, optionally d) hydrophilic polyether alcohols of the general formula

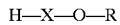

in an amount of up to 10% by weight, based on the total weight of the components b), c) and d), and optionally e) water which is not included in the calculation of the equivalence ratio of isocyanate groups to groups capable of reacting with isocyanate groups, where, in the above general formulae, m and n represent, independently of one another, numbers from 2 to 6, Me represents potassium or sodium, R represents a monovalent hydrocarbon radical having from 1 to 12 carbon atoms, and X is a polyalkylene oxide chain of the molecular weight range from 88 to 4000, whose alkylene oxide units comprise at least 40% of ethylene oxide units and the remainder are propylene oxide units.

The invention also provides for the use of these polymer blends for producing mouldings, films, fibres, coatings or laminates by thermoplastic processing.

The polymer blends of the invention are completely biodegradable. For the purposes of the invention, this means that test films having a thickness of from 0.05 to 0.5 mm, which have been produced, for example, by thermoplastic shaping, pass the film composting test described below at least as well as a corresponding cellulose film. This complete biodegradability naturally also results in satisfactory compostability of the polymer blends or the end products produced therefrom.

The term "aqueous dispersion" used below includes aqueous solutions which can exist when the concentration of hydrophilic centres in the polyurethanes containing urea groups is sufficiently high to ensure water solubility. The dispersions used according to the invention are often aqueous systems containing both dispersed and dissolved polyurethanes containing urea groups.

The component A) of the blends of the invention is starch of any desired origin, for example starch from potatoes, maize, rice or other types of cereal. In this respect there is no difference from the starch which is used according to the teachings of the above-cited publications. The water content of the starch, which is preferably used in powder form in the process of the invention, is generally from 5 to 40% by weight, preferably from 5 to 15% by weight. The fact that the component A) is referred to as "anhydrous" starch serves only to clarify the composition of the blends of the invention whose total water content is defined under point D).

The component B) used for the purposes of the invention comprises polyurethanes containing urea groups which have been prepared from the abovementioned starting materials a), b), c) and optionally d) and/or optionally e) in the mixing ratios specified. The polyurethanes containing urea groups are used in the process of the invention in the form of aqueous dispersions having a strength of from 20 to 50% by weight, preferably from 40 to 50% by weight.

The diisocyanate component a) preferably consists exclusively of hexamethylene diisocyanate.

The diol component b) comprises either b1) at least one polyesterdiol or b2) a mixture of at least one polyesterdiol b1) with up to 32% by weight, preferably up to 10% by weight, of at least one alkanediol having from 2 to 6 carbon atoms and optionally containing ether groups.

Suitable polyesterdiols b1) are those having a molecular weight calculable from the hydroxyl group content of from 500 to 10,000, preferably from 1000 to 2500 and based on (i) adipic acid and/or succinic acid and (ii) alkanediols having from 2 to 6 carbon atoms and optionally containing ether groups, for example ethylene glycol, diethylene glycol, 1,4-butanediol, neopentyl glycol and/or 1,6-hexanediol. Particular preference is given to polyester diols in whose preparation only ethylene glycol and/or 1,4-butanediol have been used as diol.

The alkanediols having from 2 to 6 carbon atoms and optionally containing ether groups which may optionally be concomitantly used as hydroxyl-containing chain extenders are those of the type just mentioned by way of example.

The diamine component c) comprises either c1) diaminosulphonates of the abovementioned general formula or c2) mixtures of such diaminosulphonates with ethylenediamine which is used, if at all, in amounts of up to 90 equivalent-%, preferably up to 70 equivalent-%, based on the amino groups of the component c) capable of reacting with isocyanate groups. Very particularly preferred diaminosulphonates are the potassium or sodium salts of N-(2-aminoethyl-2-aminoethanesulphonic acid.

The diamine component c) is generally used in an amount of from 1 to 10% by weight, preferably from 2 to 5% by weight, based on the weight of the component b).

The formative component d) which may optionally be concomitantly used comprises hydrophilic, monohydric polyether alcohols of the general formula

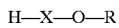

where

R and X are as defined above.

Preference is given to those polyether alcohols in which

R represents an aliphatic hydrocarbon radical having from 1 to 4 carbon atoms and X represents a polyalkylene oxide chain of the molecular weight range from 500 to 4000, in which at least 40%, in particular at least 70% and particularly preferably 100%, of the alkylene oxide units present are ethylene oxide units and the remaining alkylene oxide units are propylene oxide units.

Such monohydric polyether alcohols are prepared by alkoxylation known per se of suitable initiator molecules R-OH, for example methanol, n-butanol, n-hexanol or n-decanol, with preferred use of ethylene oxide and optionally propylene oxide in the mixing ratios of the alkylene oxides corresponding to the details given above. The alkylene oxides specified can here be used as a mixture and/or successively.

The monohydric polyether alcohols d) are used, if at all, in amounts of up to 10% by weight, preferably up to 3% by weight, based on the total weight of the components b), c) and d).

A further formative component which may optionally be used in the preparation of the polyurethanes containing urea groups is e) water, which is to be considered as a reactant particularly when in the preparation of the polyurethanes the chain-extension reaction of previously prepared NCO prepolymers to be carried out in the last stage is carried out in aqueous medium, particularly when the diamines c) dissolved in the water are used in sub-equivalent amounts, based on the NCO groups of the NCO prepolymers.

Apart from these formative components, other suitable components include, in principle, subordinate amounts of trifunctional compounds, for example glycerol or trimethylolpropane which can be used either in small amounts incorporated in the polyester b1) or in free form as part of the component b2). The concomitant use of such branching molecules generally has to be compensated for by means of monofunctional compounds so that, purely in mathematical terms, linear polymers again result.

The preparation of the polyurethanes containing urea groups from the formative components mentioned by way of example can be carried out by any processes of the prior art. However, preference is given to using the known prepolymer process by preparing an NCO prepolymer or semiprepolymer from the components b) and optionally d) and also the diisocyanate component a) with the NCO/OH equivalence ratio being from 1.5:1 to 4:1, preferably from 1.8:1 to 2.5:1, and subsequently reacting the prepolymer or semiprepolymer with the component c) to extend the chains.

In this method, the prepolymer or semiprepolymer is generally prepared solvent-free at temperatures of from 20 to 150° C. and subsequently dissolved in a suitable solvent. Of course, it is also possible to form the prepolymers or semiprepolymers directly in a solvent. Suitable solvents are, in particular, solvents which are completely miscible with water and are inert towards isocyanate groups. Preference is given to using acetone as solvent.

The prepolymers or semiprepolymers thus prepared are reacted in the second reaction stage with the component c) to extend the chains. Here, the equivalence ratio of isocyanate groups of the prepolymers or semiprepolymers on the one hand to amino groups of the component c) capable of reacting with isocyanate groups, on the other hand, is from 1:1 to 20:1, preferably from 1.2:1 to 4:1. The chain-extension reaction can be carried out in solution, preferably in acetone solution or else in aqueous medium, by combining, with intensive mixing, the solution of the prepolymers or semiprepolymers in an organic solvent with a solution of the component c) in water. As indicated above, a chain-extension reaction may also occur here by reaction of the NCO groups of the prepolymers or semiprepolymers with the water. In the said, preferred two-stage preparation of the polyurethanes containing urea groups, the equivalence ratios between isocyanate groups and groups capable of reacting with isocyanate groups in the two reaction stages are, for the purposes of this disclosure, selected in such a way that the total ratio of isocyanate groups to groups of the components b) to d) capable of reacting with isocyanate groups corresponds to the abovementioned ratio of from 1:1 to 2:1. In no event is the water included in the calculation of the specified equivalence ratios.

The chain-extension reaction is generally carried out within the temperature range from 20 to 50° C.

It is possible in principle, but not at all preferred, for the chain-extension reaction to be carried out in the melt, i.e. in the absence of solvents and of water (melt dispersion process).

To prepare the dispersions to be used according to the invention, the chain-extended polyurethanes or their solutions in organic solvents, if the chain-extension reaction has been carried out in the absence of water, are mixed with the dispersion water, if appropriate followed by the distillative removal of at least part of any auxiliary solvent used. If the chain-extension reaction has been carried out in aqueous medium, further water may be added to prepare the aqueous dispersions. In this case too, it is of course possible for the auxiliary solvent used to be removed by distillation if desired.

The total amount of water used is here such that aqueous dispersions having the abovementioned solids content result.

In carrying out the process of the invention, the component B) is used in amounts of from 0.1 to 70% by weight, preferably from 0.5 to 50% by weight and particularly preferably from 5 to 40% by weight, based on the weight of the starch, with these percentages being based on anhydrous starch and anhydrous polyurethane.

The component C) comprises plasticizers known per se for the starch, for example urea or polyhydric alcohols of the molecular weight range from 62 to 400, preferably from 62 to 200, for example ethylene glycol, propylene glycol, glycerol, sorbitol, mannitol, polyethylene glycols of the said molecular weight range or any mixtures of such plasticizers.

In the process of the invention, these plasticizers can, if desired, be used in the form of aqueous solutions.

The amount of the plasticizer C) used in the process of the invention is from 0.5 to 70% by weight, preferably from 5 to 60% by weight and particularly preferably from 10 to 50% by weight, based on the weight of the starch, with the percentages being based here too on anhydrous substances.

The water D) present in the polymer blends of the invention generally represents the residual content of the water not removed by evaporation and introduced with the starting components A) to C) and/or separately. The water content of the polymer blends of the invention is from 2 to 20% by weight, preferably from 5 to 10% by weight, based on the weight of the anhydrous starch A).

The process of the invention is carried out in conventional plastics processing machines such as injection-moulding machines or extruders. Temperatures used here are generally from 80 to 180° C., preferably from 100 to 160° C.

The process of the invention can be carried out, for example, by first intimately mixing the components A) and C), optionally with concomitant use of added water, and subsequently metering in the component B) in the form of an aqueous dispersion. Excess water can be removed during the course of the mixing and in particular at the end of the extruder by means of a stripping device.

The completely biodegradable and thermoplastically processable granulated materials thus produced can be used according to the invention in known plastics processing machines such as injection moulding machines.

The polymer blends of the invention can be employed, in particular, for producing injection-moulded parts, for extrusion for blow moulding of, for example, bottles, plant pots and other hollow bodies, for producing films, e.g. for biological garbage bags or for garden and agricultural use, or else for producing fibres.

The advantages of the polymer blends of the invention compared with fully synthetic biodegradable polymers are, inter alia, the lower production price made possible by the use of starch and the use of a renewable raw material. Compared with the blends of starch and synthetic polymers already known, the starch/polyurethane-polyurea blends are found to be superior as a result of the 100% biodegradability of the polyurethane-polyurea and as a result of the excellent film-forming capability of the polyurethane-polyurea and the very good mechanical properties of the blends associated therewith, e.g. the good tear strength or the impact toughness. Even in the case of high proportions of starch of over 90% by weight, the polymer blends of the invention still have sufficient mechanical properties for many applications. In addition, the good compatibility of the individual components prevents the embrittlement known for many other starch blends.

The biodegradability of the polymer blends of the invention can be determined, for example, using the film composting test. For this purpose, injection-moulded films having a thickness of from 0.01 to 0.1 mm are generally used.

To carry out the film composting test, the films to be tested are first dried to constant weight at 80° C. and then mounted in 6×6 transparency frames. 2 cm of compost from a composting facility are placed in plastic dishes and the films are inserted therein. The filled boxes are incubated in an incubator for 4 weeks in each case successively at 60, 50 and 37° C. Water losses are determined via the weight loss and compensated for. During the incubation, the pH of the compost is measured once per week. After 4 weeks in each case, a batch is stopped, the films are taken out, cleaned, dried to constant weight at 80° C. and photographed. Immediately after drying, the weight loss of the film is determined by reweighing.

In the poisoned control, the compost is dried at 105° C. and the water evaporated was then replaced by a 1% strength $HgCl_2$ solution. The films for the poisoned control are laid in the $HgCl_2$ solution prior to introduction into the compost mixture, dried and then introduced into the poisoned compost. The control batch is incubated exactly like the other batches.

A plastic is described as degradable if a film produced therefrom disappears completely in the microbially active batches like the cellulose film used in a parallel experiment, and remains in the poisoned control.

In the following examples, all percentages are by weight.

EXAMPLE 1

Production of a dispersion of a polyurethane B) to be used according to the invention 170 g of a polyesterdiol of molecular weight 1700 from adipic acid and a mixture of 1,6-hexanediol and neopentyl glycol in a weight ratio of 1.9:1 are degassed in vacuo for 60 minutes at 120° C. Under nitrogen, 0.2 ml of benzoyl chloride and in one shot 30.1 g of hexamethylene diisocyanate are added to the mixture. After stirring for 30 minutes at 120° C., the NCO content is 3.2%. The prepolymer is dissolved at 50° C. in 500 g of acetone, cooled to room temperature and a mixture of 9.7 g of a 50% strength aqueous solution of AAS salt and 1.51 g of ethylenediamine and 20 g of water are added to the acetone solution while stirring rapidly. After stirring for 15 minutes, 300 g of water are added and the acetone is removed at up to 60° C. and 140 mbar. The distillation residue is 505 g. Dilution with 11 g of water gives a 40% strength, fluid, white polyurethane-urea dispersion.

A sample of the dispersion is diluted with water, poured onto a glass plate and dried. This gives a clear, tack-free film having an elongation at break of more than 200%. The thickness is 0.25 mm.

EXAMPLE 2

(process of the invention)

For carrying out the process of the invention, use is made of an extruder having heatable zones which are maintained at the following temperatures:

Zone 1: RT, Zone 2: 100° C., Zone 3: 140° C., Zone 4: 160° C., Zone 5: 160° C., Zone 7: 150° C., Zone 8: 160° C.

The rotational speed of the extruder shaft is 40 rpm. The starch used (potato starch having a water content of 10%) is mixed with glycerol (57%, based on anhydrous starch) and water (32%, based on anhydrous starch) in the feed zone of the extruder. The 40% strength polyurethane dispersion as described in Example 1 is metered into the zone 4 in an amount of 11% polyurethane solids, based on anhydrous starch.

Attached to the zone 7 there is a distillation apparatus by means of which excess water is distilled off to a residual content of 10%, based on anhydrous starch. The extruded strand of the polymer blend of the invention is granulated immediately after exit from the extruder. The softening point of the granulated material is 120° C.

EXAMPLE 3

(use according to the invention)

Using an injection moulding machine D50 from Demag, Nuremberg, the granulated material produced as described in Example 2 is injected without further treatment. The temperatures of the heating zones are here 125° C., 130° C., 140° C. and 150° C. at the injection nozzle. The mould used is a plant pot mould held at room temperature.

We claim:

1. Thermoplastically mouldable, biodegradable, starch-containing polymer blends consisting essentially of
    A) 100 parts by weight of anhydrous starch,
    B) from 0.1 to 70 parts by weight of polyurethane containing urea groups,
    C) from 0.5 to 70 parts by weight of a plasticizer component comprising urea and/or at least one polyhydric alcohol of the molecular weight range from 62 to 400 and
    D) from 2 to 20 parts by weight of water, characterized in that the component B) comprises polyurethanes containing urea groups which have been prepared by known methods, with the equivalence ratio of isocyanate groups to groups capable of reacting with isocyanate groups being from 1:1 to 2:1, from
    a) a diisocyanate component comprising
        a1) hexamethylene diisocyanate or
        a2) mixtures of hexamethylene diisocyanate with a total of up to 60% by weight, based on the mixture, of 1-isocyanato-3,3,5-trimethyl-5-isocyanatomethyl-cyclohexane and/or 4,4'-diisocyanatodicyclohexylmethane and/or 1-methyl-2,4(6)diisocyanatocyclohexane together with
    b) a diol component comprising
        b1) at least one polyesterdiol having a molecular weight calculable from the hydroxyl group content of from 500 to 10,000 from (i) adipic acid and/or succinic acid and (ii) at least one alkanediol having from 2 to 6 carbon atoms or
        b2) a mixture of such polyesterdiols containing up to 32% by weight, based on the total weight of the component b), of alkanediols having from 2 to 6 carbon atoms and optionally containing ether groups, c) a diamine component in an amount of from 2 to 50 equivalent-%, based on the total amount of the groups capable of reacting with isocyanate groups and present in the components b) and c), comprising
   c1) diaminosulphonates of the general formula

or
   c2) mixtures of diaminosulphonates c1) with up to 90% by weight, based on the total weight of the component c), of ethylenediamine, optionally
d) hydrophilic polyether alcohols of the general formula

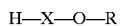

in an amount of up to 10% by weight, based on the total weight of the components b), c) and d), and optionally
e) water which is not included in the calculation of the equivalence ratio of isocyanate groups to groups capable of reacting with isocyanate groups, where, in the above general formulae, m and n represent, independently of one another, numbers from 2 to 6, Me represents potassium or sodium, R represents a monovalent hydrocarbon radical having from 1 to 12 carbon atoms, and X is a polyalkylene oxide chain of the molecular weight range from 88 to 4000, whose alkylene oxide units comprise at least 40% of ethylene oxide units and the remainder are propylene oxide units.

2. Process for producing polymer blends according to claim 1 by mixing the individual components at from 80 to 150° C. in plastics processing machines, where the starch A) is optionally used in the form of water-containing starch and/or the plasticizers C) are used in the form of aqueous solutions, with simultaneous or subsequent removal of the introduced water by evaporation to a residual content of from 2 to 20 parts by weight per 100 parts by weight of anhydrous starch, characterized in that the polyurethanes B) containing urea groups are used in the form of aqueous dispersions which have a strength of from 20 to 50% by weight and which have been prepared by known methods, with the equivalence ratio of isocyanate groups to groups capable of reacting with isocyanate groups being from 1:1 to 2:1, from a) a diisocyanate component comprising
   a1) hexamethylene diisocyanate or
   a2) mixtures of hexamethylene diisocyanate with a total of up to 60% by weight, based on the mixture, of 1-isocyanato-3,3,5-trimethyl-5-isocyanatomethyl-cyclohexane and/or 4,4'-diisocyanatodicyclohexylmethane and/or 1-methyl-2,4(6-diisocyanatocyclohexane together with b) a diol component comprising
   b1) at least one polyesterdiol having a molecular weight calculable from the hydroxyl group content of from 500 to 10,000 from (i) adipic acid and/or succinic acid and (ii) at least one alkanediol having from 2 to 6 carbon atoms or
   b2) a mixture of such polyesterdiols containing up to 32% by weight, based on the total weight of the component b), of alkanediols having from 2 to 6 carbon atoms and optionally containing ether groups, c) a diamine component in an amount of from 2 to 50 equivalent-%, based on the total amount of the groups capable of reacting with isocyanate groups and present in the components b) and c), comprising
   c1) diaminosulphonates of the general formula

or
   c2) mixtures of diaminosulphonates c1) with up to 90% by weight, based on the total weight of the component c), of ethylenediamine, optionally d) hydrophilic polyether alcohols of the general formula

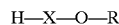

in an amount of up to 10% by weight, based on the total weight of the components b), c) and d), and optionally e) water which is not included in the calculation of the equivalence ratio of isocyanate groups to groups capable of reacting with isocyanate groups, where, in the above general formulae, m and n represent, independently of one another, numbers from 2 to 6, Me represents potassium or sodium, R represents a monovalent hydrocarbon radical having from 1 to 12 carbon atoms, and X is a polyalkylene oxide chain of the molecular weight range from 88 to 4000, whose alkylene oxide units comprise at least 40% of ethylene oxide units and the remainder are propylene oxide units.

3. A method for preparing thermoplastically formed shaped articles which comprises thermoplastically processing the composition of claim 1 into said shaped articles.

4. A method as recited in claim 3, wherein the shaped articles are formed by coating, laminating, fiber forming, extruding or molding.

5. The products of the method of claim 3.

6. The products of the method of claim 4.

* * * * *